July 22, 1930.　　　C. Y. KNIGHT　　　1,771,128
LUBRICATOR
Filed Nov. 28, 1925　　　2 Sheets-Sheet 1
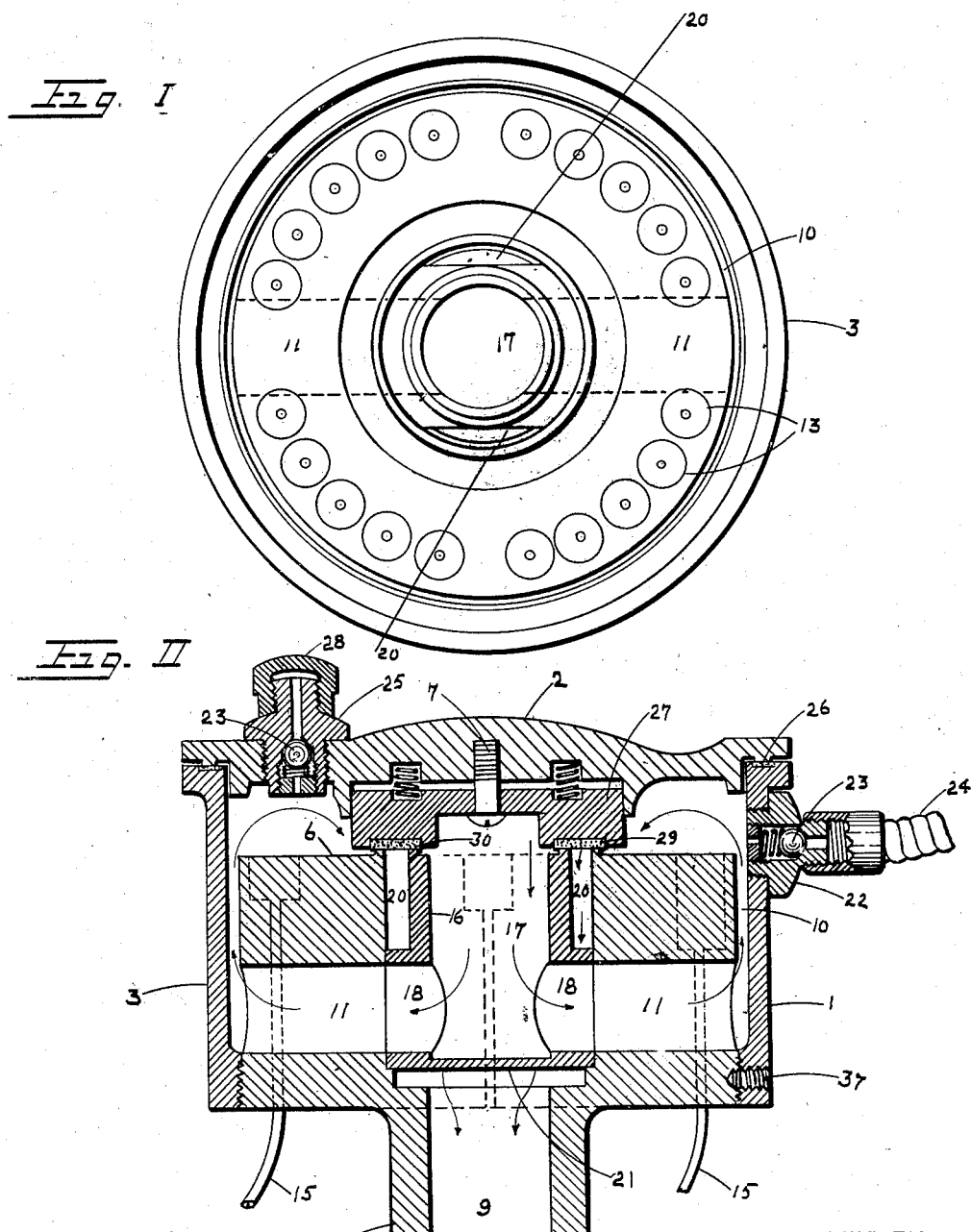

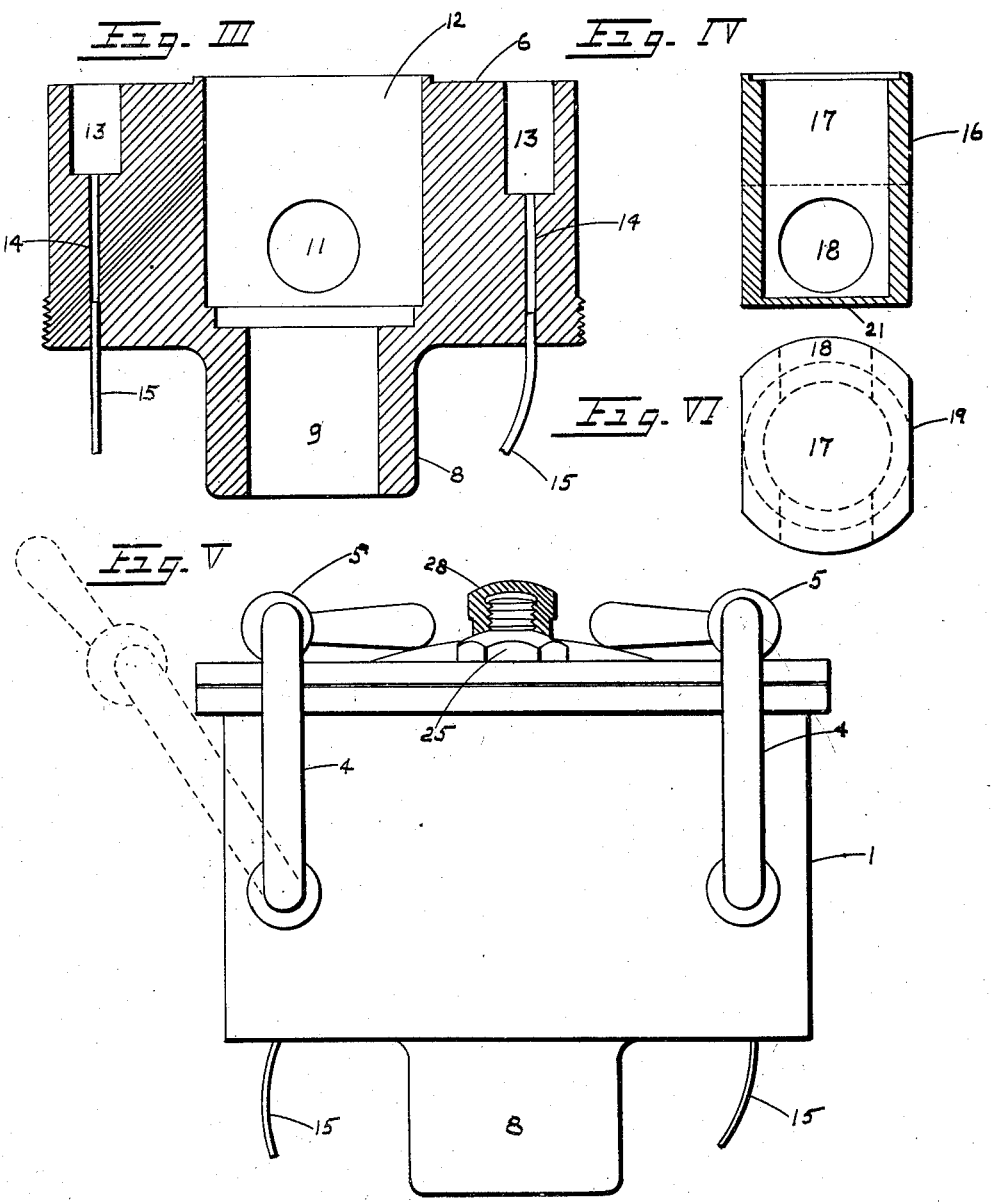

Patented July 22, 1930

1,771,128

UNITED STATES PATENT OFFICE

CHARLES Y. KNIGHT, OF PASADENA, CALIFORNIA, ASSIGNOR TO THE WILLYS-OVERLAND COMPANY, OF TOLEDO, OHIO, A CORPORATION OF OHIO

LUBRICATOR

Application filed November 28, 1925. Serial No. 71,942.

This invention relates to lubricators and more particularly to centralized lubricators for the lubrication of a plurality of parts located at some distance from the lubricator.

One of the objects of the invention is to provide a lubricator for the chassis parts of an automobile whereby the parts are lubricated from a common supply.

Another object of the invention is to provide a centralized lubricator for the chassis parts of an automobile in which the replenishment of lubricant will be coincidental with the engine lubrication.

Another object of the invention is to provide a lubricator wherein the replenishment of the lubricant will be approximately regular.

Another object of the invention is to provide a centralized lubricator for the chassis parts of an automobile in which the flow of lubricant is increased by gaseous pressure above the lubricant.

Another object of the invention is to provide a centralized lubricator in which the various lubricant passages may be simultaneously cleaned.

Other objects, and objects relating to details of construction and economies of manufacture, will appear as I proceed with the description of that embodiment of the invention, which, for the purposes of the present application, I have illustrated in the accompanying drawings, in which:

Figure I is a plan view of the improved centralized lubricator with the cover removed.

Fig. II is a vertical sectional view of the lubricator and cover.

Fig. III is a vertical sectional view of the reservoir member.

Fig. IV is a sectional view of the filler tube.

Fig. V is a side elevational view of the lubricator showing the means for removing and securing the cover.

Fig. VI is a bottom plan view of the filler tube.

Referring to the drawings in which similar reference characters refer to like parts throughout the views 1 generally denotes a motor vehicle lubricator which is adapted to be secured to the vehicle engine (not shown).

Vehicle engines are ordinarily equipped with an opening for replenishing the engine lubricant, and as the replenishment occurs at somewhat regular periods I have combined with this opening a vehicle lubricator in which the various oil leads to the chassis parts, are so situated that oil is automatically delivered to them whenever a fresh supply of lubricant is added to the engine. By arranging both the engine oil filler and the vehicle oil leads in one centralized lubricator, I have relieved the vehicle operator from the necessity of giving attention to a number of widely separated lubricators. Regularity of vehicle lubrication is also secured, as the operator is accustomed to regularly replenish the engine oil supply, and a mere continuation of his routine in regard to engine lubrication insures adequate vehicle lubrication.

Lubricator 1, in order to be conveniently used as an engine oil filler, is equipped with a removable cover 2 secured to the body portion 3 by clamps 4 and having hand operated eccentrics 5. Within body portion 3, is a reservoir member 6 which is in tight threaded engagement with body 3 at its lower end, and securely locked against accidental disengagement by screw 37. Reservoir member 6 is provided with a lower extension 8 having an opening 9 which is adapted to be in free communication with the engine (not shown). The upper portion of the reservoir member is reduced in diameter so as to provide an annular space 10 between the member and the body 3. Passages 11 are provided in the reservoir member which lead from the central opening 12 to the annular space 10. Cavities 13, which may be of varying depths depending upon the requirements of the parts to be lubricated, are formed in the upper side of member 6, which cavities are adapted to be connected, by means of passages 14 and pipes 15 to the vehicle parts (not shown) needing lubricant. Tightly fitted within central opening 12 is a filler tube 16 having a central passage 17 and communicating openings 18 in alignment with passages 11, and having flatted portions 19 which form with member 6 segmental passageways extending downwardly from the top of member 6 to opening 9. Filler tube 16 has its lower end closed by wall 21 so that the segmental passageways 20 are the only direct paths from the top of member 6 to opening 9.

In operation cover 2 is first removed by means of clamps 4, and the engine (not shown) oil supply is replenished in the usual manner through passage 17. The oil in passing to the engine, flows in the direction shown by the arrows in Fig. II from passage 17 through openings 18 into passageway 11 and into annular space 10. From annular space 10 the flow is upwardly, over the top of reservoir member 6, in which are located cavities 13, and into the segmental passages 20 which are in direct communication with opening 9 in extension 8. The various openings and passageways within the reservoir member cause the oil to first fill cavities 13 before entering the engine and thus automatically render a small portion of the engine oil available for vehicle lubrication. From cavities 13 the oil is led, by means of passages 14 and pipes 15, to the outside of the lubricator and to the parts to be lubricated. The vehicle parts (not shown) requiring lubrication are ordinarily below the level of the lubricator and oil will flow to them by gravity, but in order to accentuate the flow of oil and to provide lubrication for such parts as may be above the level of the lubricator, I provide a fitting 22 having a spring loaded check valve 23 which may be connected by tube 24 to the exhaust pipe (not shown) of the engine. Another fitting 25 protected by cap 28 and having a check valve 23 is conveniently located in cover 2 and provides a means whereby high pressure air may be introduced to the lubricator and thoroughly clean the small oil tubes 15. If it be desired, fitting 25 may be omitted and the air pressure introduced through fitting 22, after disconnecting it from exhaust tube 24. The omission of fitting 25 will also remove the necessity for check valve 23 within fitting 22, as none is necessary with a single fitting. The preferable procedure in using the air pressure is to apply it, by means of the usual air hose ordinarily kept at oil supply stations, immediately before removing cover 2, as after the cover is removed a visual inspection of cavities 13 may easily be made. If the inspection reveals that all cavities are free from oil it may be reasonably presumed that the lubricator is functioning properly and that a replenishing of the oil supply is all that is necessary.

Cover 2 is preferably provided with a gasket 26 to insure a tight connection with the body. A spring loaded member 27 closes segmental passages 20 when the cover is in its normal closed position and is movably secured to the under side thereof by screw 7. Gasket 29 is preferably secured to the under face of member 27 by being tightly pressed into annular groove 30 and should be formed from an oil resisting material such as fibre. Member 27 because of the securing screw 7, on which it is slidable, is removed as a unit with the cover 2 so that passage 17 is unobstructed for the introduction of a supply of oil and in the normal position of cover 2 presses against reservoir member 6 and filler tube 16 which are substantially of the same height at their points of contact with gasket 29. If cover 2 be of sufficient resiliency, member 27 may be formed integral with cover 2, as it will then be possible to secure sealing contacts of the gaskets 26 and 29, without permitting any relative movement between member 27 and cover 2.

It may be readily seen that the lubricator described will cause a fresh supply of oil to be delivered to the vehicle lubricant cavities whenever a fresh supply of oil is added to the engine, and that attention need only be directed to the lubrication supply of the engine, which is rarely neglected because of the almost universal knowledge of its importance. After the oil is delivered to the cavities, all outlets from the reservoir except the tubes leading from the bottom of the cavities, are automatically closed by the installation of the cover 2, and pressure from the engine exhaust delivered through fitting 22 will assist the normal gravity flow of oil to the vehicle parts.

While I have illustrated and described somewhat in detail, certain embodiments of my invention, it is to be understood that this showing and description are illustrative only, and that I do not regard the invention as limited to the details of construction illustrated and described, except insofar as I have included such limitations within the terms of the following claims, in which it is my intention to claim all novelty inherent in the invention, broadly as well as specifically.

I claim as my invention:

1. In a lubricator for a motor vehicle having an engine, a lubricator body having passages therein, a detachable cover for said body, means within the body whereby certain of said passages are in communication with the engine and certain others are in communication with movable vehicle parts, said cover having its under face adapted to close said engine communicating passage in the normal position, and means to establish communication between said engine passages and said vehicle passages when the cover is removed.

2. In a lubricator for a motor vehicle having an engine, a conduit for supplying a lubricant to said engine, an oil lead adjacent the entrance of said conduit, means for causing a portion of lubricant passing through said conduit to enter said lead, a removable cover for said lubricator having its under side forming a gas tight closure for said conduit, and means for introducing gaseous pressure from the engine to said lubricator, whereby lubricant is forced through said lead.

3. In a lubricator for a motor vehicle having an engine, a conduit for supplying lubricant to an engine, an oil lead having its entrance adjacent said conduit, means for causing a portion of a lubricant passing through said conduit to enter said lead, a cover forming a closure for said conduit and a chamber in communication with said lead, said cover having two openings with inwardly opening check valves, one of said openings being adapted to admit gaseous pressure from said engine to said chamber, and the other being adapted to admit high pressure gas for cleaning the oil leads.

4. In a lubricator for a motor vehicle, a main oil passage, a smaller oil passage having an opening into the main passage, said opening being adapted to be submerged by oil within the main passage, and a removable cover for the lubricator adapted to yieldably close the opening to one of said passages.

5. In a lubricator for a motor vehicle, a main oil passage, a smaller oil passage having an opening into the main passage, said opening being adapted to be submerged by oil within the main passage, a removable cover for the lubricator adapted to yieldably close the opening to one of the passages, and means for applying gaseous pressure to the other passage.

In testimony whereof, I affix my signature.

CHARLES Y. KNIGHT.